US010977020B2

(12) United States Patent
Worsnop et al.

(10) Patent No.: US 10,977,020 B2
(45) Date of Patent: Apr. 13, 2021

(54) PROVIDING CONTEXT-BASED APPLICATION SUGGESTIONS

(71) Applicant: VMware, Inc., Palo Alto, CA (US)

(72) Inventors: Rob Worsnop, Atlanta, GA (US);
David Shaw, Palo Alto, CA (US);
Shree Harsha, Bangalore (IN);
Marshall Anne Busbee, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/220,982

(22) Filed: Dec. 14, 2018

(65) Prior Publication Data

US 2020/0192652 A1   Jun. 18, 2020

(51) Int. Cl.
*G06F 8/61* (2018.01)
*G06Q 10/10* (2012.01)
*G06N 20/00* (2019.01)
*G06K 9/34* (2006.01)

(52) U.S. Cl.
CPC ............ *G06F 8/61* (2013.01); *G06K 9/344* (2013.01); *G06N 20/00* (2019.01); *G06Q 10/107* (2013.01); *G06K 2209/01* (2013.01)

(58) Field of Classification Search
CPC .......... G06F 8/61; G06N 20/00; G06K 9/344; G06K 2209/01; G06Q 10/107
See application file for complete search history.

(56) References Cited

U.S. PATENT DOCUMENTS

| 8,146,074 | B2* | 3/2012 | Ito .............................. G06F 8/65 717/170 |
| 8,191,061 | B2* | 5/2012 | Jun .......................... G06F 8/61 455/419 |
| 8,396,759 | B2* | 3/2013 | Mehta ..................... H04L 67/18 705/26.7 |
| 9,600,258 | B2* | 3/2017 | Ramachandran ......... G06F 8/61 |
| 9,798,737 | B2* | 10/2017 | Palmer .................. G06F 16/185 |
| 9,887,941 | B1 | 2/2018 | Guarraci |
| 2004/0043758 | A1* | 3/2004 | Sorvari ............. H04M 1/72561 455/414.1 |
| 2006/0212286 | A1 | 9/2006 | Pearson |
| 2011/0067023 | A1* | 3/2011 | Chiyo ....................... G06F 8/61 717/177 |
| 2011/0208822 | A1* | 8/2011 | Rathod ............... G06F 16/9535 709/206 |

(Continued)

*Primary Examiner* — Douglas M Slachta
(74) *Attorney, Agent, or Firm* — Clayton, McKay & Bailey, PC

(57) ABSTRACT

Systems and methods disclosed herein provide context-based application suggestions to a user in real time. A user device can identify a keyword displayed in an application, such as an email application. The user device can request a card from a connector external to the user device. The connector can identify an application that relates to the keyword and determine a current installation status for the application with respect to the user device. The connector can query a management server at which the user device is enrolled to request the installation status. If the application is not installed on the user device, the connector can instruct the user device to prompt the user to install the application. If the application is installed, the connector can instruct the user device to prompt the user to launch the installed application.

11 Claims, 7 Drawing Sheets

(56) References Cited

U.S. PATENT DOCUMENTS

| | | | | |
|---|---|---|---|---|
| 2011/0320307 A1* | 12/2011 | Mehta | ............... | G06Q 30/0282 |
| | | | | 705/26.7 |
| 2012/0272231 A1* | 10/2012 | Kwon | ...................... | G06F 8/61 |
| | | | | 717/173 |
| 2013/0191397 A1* | 7/2013 | Avadhanam | ...... | G06F 16/24578 |
| | | | | 707/748 |
| 2013/0275429 A1* | 10/2013 | York | ..................... | G06Q 50/01 |
| | | | | 707/737 |
| 2013/0326499 A1* | 12/2013 | Mowatt | .................... | G06F 8/60 |
| | | | | 717/177 |
| 2014/0157387 A1* | 6/2014 | Lee | ........................ | H04W 4/50 |
| | | | | 726/7 |
| 2014/0215367 A1* | 7/2014 | Kim | ................... | G06F 3/04842 |
| | | | | 715/765 |
| 2015/0007157 A1* | 1/2015 | Park | ......................... | G06F 8/65 |
| | | | | 717/170 |
| 2015/0081440 A1* | 3/2015 | Blemaster | .......... | G06F 3/04817 |
| | | | | 705/14.54 |
| 2015/0161134 A1* | 6/2015 | Balani | ............... | G06F 16/24578 |
| | | | | 707/731 |
| 2015/0163186 A1 | 8/2015 | Tian | | |
| 2015/0350123 A1* | 12/2015 | Park | ..................... | G06F 3/0484 |
| | | | | 715/752 |
| 2016/0171511 A1* | 6/2016 | Goel | ..................... | G06Q 50/01 |
| | | | | 705/7.29 |
| 2016/0216955 A1* | 7/2016 | Kwon | ...................... | G06F 8/63 |
| 2017/0315826 A1* | 11/2017 | Samal | ..................... | G06F 9/453 |
| 2018/0129703 A1* | 5/2018 | Eichberger | ............ | G06F 16/245 |

\* cited by examiner

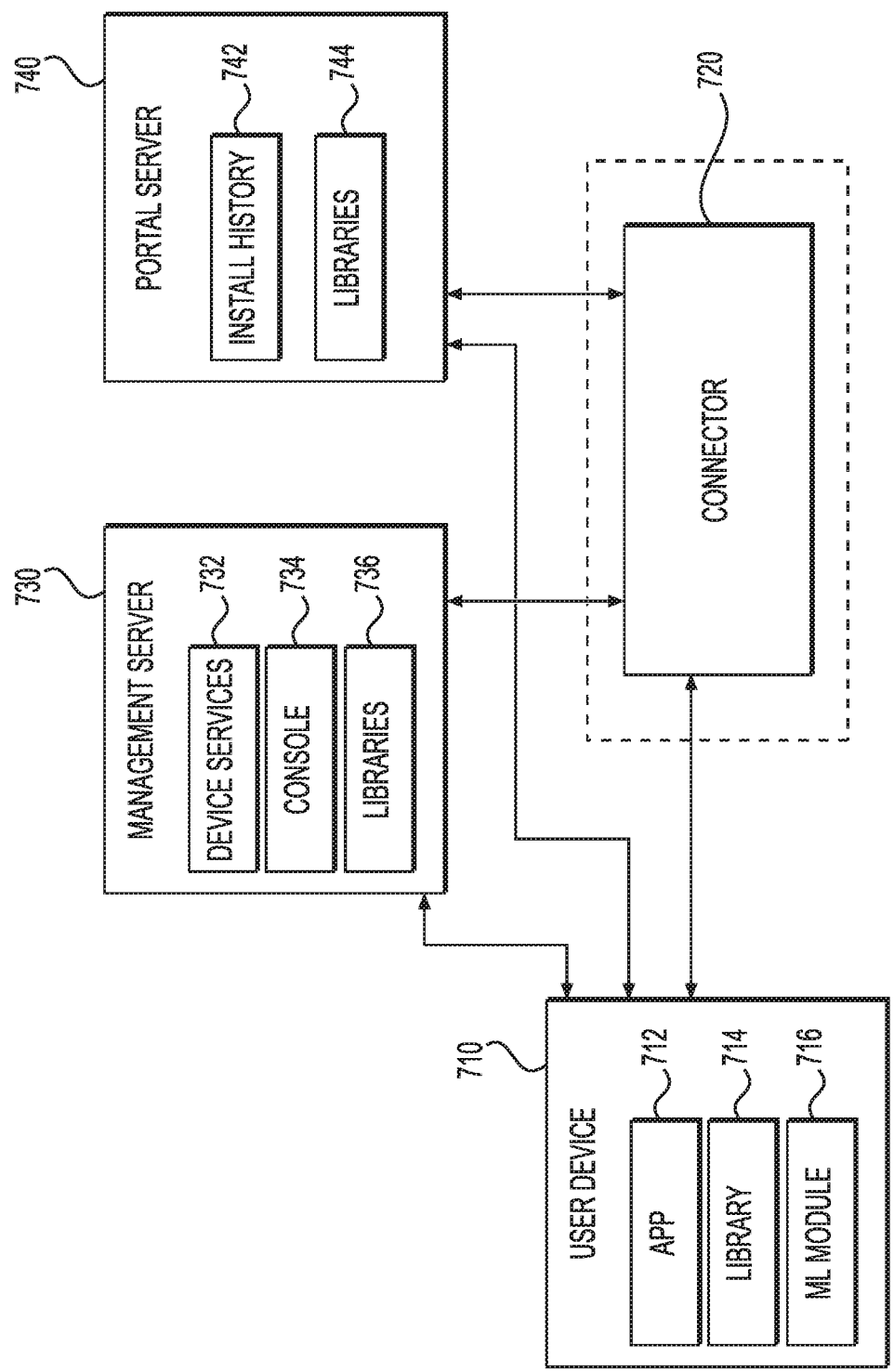

PROVIDING CONTEXT-BASED APPLICATION SUGGESTIONS

BACKGROUND

Many enterprises seek to increase company efficiency by providing applications for employees, or users, to utilize when performing work-related tasks. Enterprises can buy these applications or build them if they are not otherwise available. In either case, enterprises can invest significant resources providing applications to help users perform tasks more efficiently. The users can access the applications on their devices, such as phones, tablets, laptops and other computing devices.

But access to an ever-expanding catalog of applications carries a significant downside: low adoption rates. Users presented with a large list of available applications may not have the time or motivation to investigate each one and determine whether it is worth using. In some instances, a large enterprise can provide hundreds of applications to users within the enterprise. It can be burdensome to explore that volume of options, causing many users to skip the process altogether and continue handlings tasks in a known (albeit potentially less efficient) manner.

In an attempt to boost application adoption rates, an enterprise can send emails or other messages to users providing them with information on various applications. But absent an immediate need for a new application, users will generally ignore such messages. Furthermore, the message may not be specific to the user or their particular role, leading them to ignore the message for that reason as well. Providing personalized, timely messages to remind users of available applications is simply not feasible using current systems. Such messages would also fail to account for whether a user has already installed an application.

As a result, a need exists for systems and methods for providing context-based application suggestions. A need further exists for these systems and methods to determine whether an application is already installed on a user device and provide suggestions accordingly.

SUMMARY

It is to be understood that both the foregoing general description and the following detailed description are exemplary and explanatory only and are not restrictive of the examples, as claimed.

In one example, a method is disclosed for providing context-based suggestions. The example method can include receiving a card request from a user device. A "card" can refer to a bundle of information that is presentable in a graphical format at a graphical user interface ("GUI") of a user device. A card request can be a request for that bundle of information, originating at the user device. The user device can send the card request based on identifying one or more keywords (which are understood to include multi-word phrases in addition to singular keywords) in text received at the user device, such as a text-based email. A list of keywords can be provided in advance to the user device, along with instructions on requesting a card based on those keywords. In some examples, the user device can utilize a machine-learning model to identify keywords.

The card request can include information required to generate a card, such as the keywords described above, a device identifier that identifies the user device, and an operating system identifier that identifies at least the type of operating system executing on the user device. The example method can include receiving the card request at a server that is remote from the user device. The request can be received by an application-discovery connector executing on the server, for example.

The application-discovery connector can identify one or more applications based on the keyword or keywords provided in the card request, along with the operating system identifier. The application-discovery connector can then use the device identifier to determine whether the identified application is installed on the requesting user device. If the user device is enrolled with a management server, the application-discovery connector can contact the management server and request an installation status for the application. If the user device is not enrolled with the management server but includes a portal application through which applications can be downloaded and launched, the application-discovery connector can query a portal application server that supports the portal application to determine whether the user device has downloaded the relevant application in the past.

If the application-discovery connector determines that the application is not installed on the user device, it can instruct the user device to prompt the user to install the application. This can include, for example, generating a card that can cause the user device to display a graphical card prompting the user to install the application, and sending that card to the user device. If the application-discovery connector determines that the application is installed on the user device, it can instruct the user device to prompt the user to launch the application.

The example methods summarized above can be incorporated into a non-transitory, computer-readable medium having instructions that, when executed by a hardware-based processor associated with a computing device, cause the processor to perform stages for providing context-based application suggestions. Additionally, the example methods summarized above can be implemented in a system including, for example, a user device and a one or more servers.

BRIEF DESCRIPTION OF THE DRAWINGS

FIG. 7 is an example illustration of system components for performing the methods described herein.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods disclosed herein provide context-based application suggestions to a user in real time. A user device can identify a keyword displayed in an application, such as an email application. The user device can request a card from a connector external to the user device. The connector can identify an application that relates to the keyword and determine a current installation status for the application with respect to the user device. The connector can query a management server at which the user device is enrolled to request the installation status. If the application is not installed on the user device, the connector can instruct the user device to prompt the user to install the application. If the application is installed, the connector can instruct the user device to prompt the user to launch the installed application.

Figure 1:
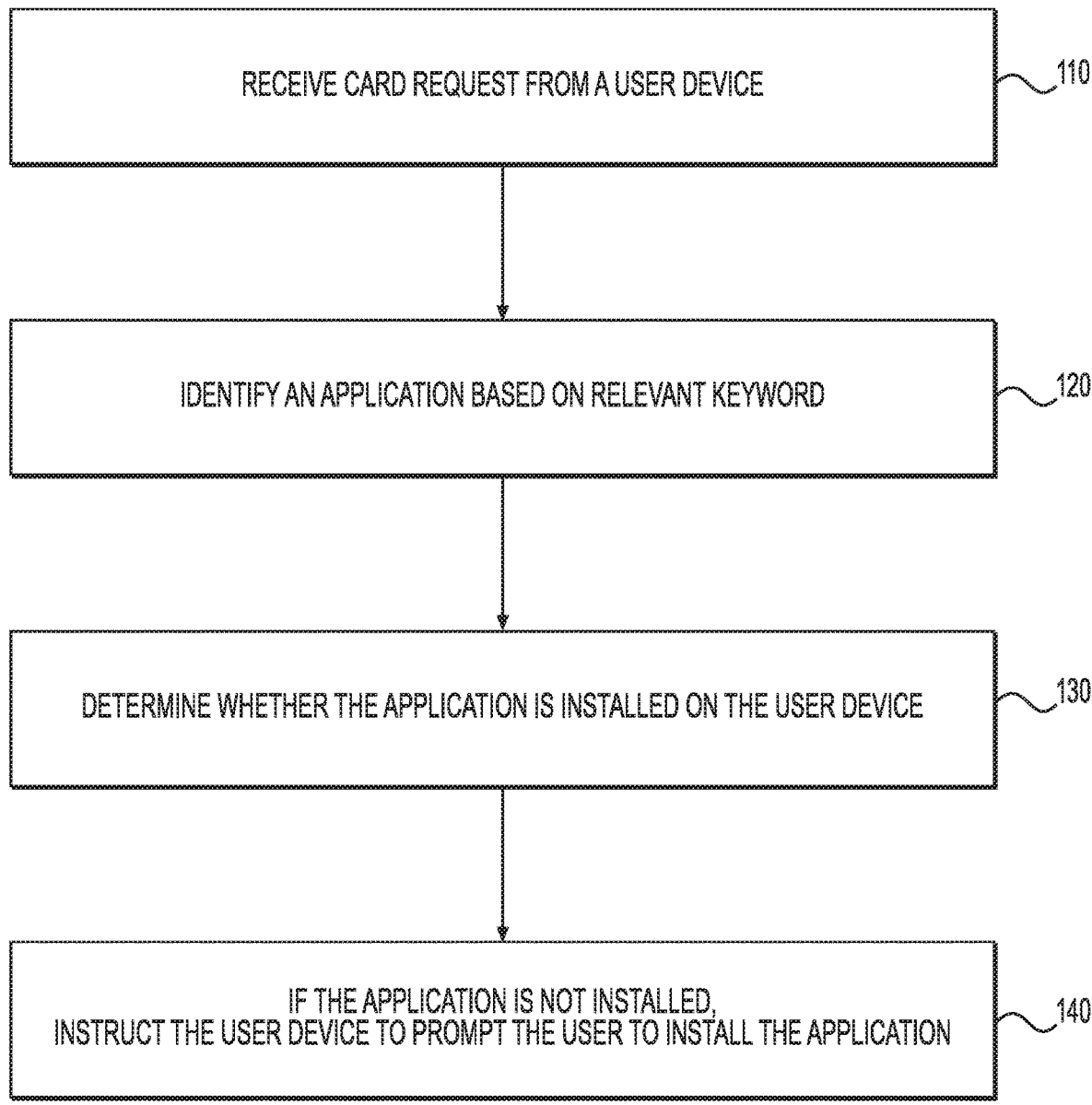
FIG. 1 is an example method for providing context-based application suggestions.

FIG. 1 provides a flowchart of an example method for providing context-based application suggestions. Stage 110 can include receiving a card request from a user device. The user device can be any computing device, such as a smartphone, laptop, tablet, personal computer, or workstation. A user device can include a non-transitory, computer-readable medium containing instructions that are executed by a hardware-based processor of the user device. Example non-transitory, computer-readable mediums include RAM and ROM, disks, and other memory and storage that is accessible by a USB port, a floppy drive, CD-ROM, or DVD-ROM drive, and a flash drive, among others.

The card request can request a card, which in some examples is a bundle of information, at least some of which is presentable in a graphical format at a GUI of the user device. The user device can send a card request based on identifying one or more keywords in text received or displayed at the user device. For example, the user device can parse an email that the user of the device selects. If the parsed email includes any keywords (which can include individual words or multi-word phrases), the user device can initialize the card request. The user device can parse other types of text in additional to emails. For example, the user device can parse text in a PDF or WORD file that is opened at the user device. In another example, the user device can parse text in a uniform resource locator ("URL") or on a webpage. In yet another example, the user device can parse text displayed in an application executing on the device.

Regardless of the sources of the text being parsed, the user device can compare that text to one or more lists of keywords. The keywords can be stored locally at user device or remotely at a server. In some examples, the keywords are provided by a management server at which the user device is enrolled. In other examples, the keywords are provided by a portal application that displays icons associated with applications and allows access to those applications through the portal application. If the user device finds one or more keyword matches between the parsed text and the keyword list(s), the device can send a card request that includes those matching keywords.

The card request can be received at a server remote from the user device. More specifically, in some examples the card request can be received at an application-discovery connector. A connector can be one or more pieces of code that, when invoked, translates commands between a source and a destination. The application-discovery connector can receive the card request at stage 110. In some examples, the application-discovery connector executes on a management server at which the user device is enrolled. In other examples, the application-discovery connector executes on a portal-application server that supports a portal application executing on the user device. In yet other examples, the application-discovery connector executes on a separate server.

In addition to containing one or more keywords, the card request can also include a device identifier that provides a unique identifier for the user device at which the request originates. The card request can also include an operating system identifier that identifies the type of operating system executing on the user device. In some examples, the card request can also include information specifying a version of the operating system executing on the user device, an identification of the user of the user device, a compliance status of the user device, or any other information about the user device. Furthermore, the card request can include a credential that authenticates the user or the user device. The credential can be a single-sign-on ("SSO") token, another type of token or certificate, a username and password combination, or any other type of credential.

Stage 120 can include identifying an application based, at least in part, on the keyword or keywords received in the card request. Stage 120 can be performed by the application-discovery connector, in an example. The application-discovery connector can compare the keywords to a table that lists keywords and their accompanying application. The table can include a first column for keywords and a second column for a related application. For example, the table can include the keyword "expense" in a row of the first column, and in the second column of the same row can include an expense-tracking application such as CONCUR or QUICKBOOKS. In some examples, multiple applications can be included in the second column of the table.

Stage 120 can also include utilizing an operating-system identifier, included in the card request, to identify relevant applications. For example, a table can associate a keyword to two versions of the same application, each of which is configured for a different operating system. Using the example above, the keyword "expense" could be associated with a first version of CONCUR for iOS and a second version of CONCUR for ANDROID. The application-discovery connector can reference the operating-system identifier in the card request to identify the appropriate application between these different versions.

After identifying the relevant application at stage 120, the application-discovery connector can determine whether the application is installed on the user device at stage 130. In one example, the application-discovery connector determines whether the application is installed by contacting a management server at which the user device is enrolled. Enrollment can include registering with the management server and handing over partial control of the user device to the management server. The management server can install software on the user device, such as a management agent, that collects information and provides it to the management server. The management server can implement policies and compliance rules for the device, monitoring the status of the device and taking actions as prescribed by an administrator of the management server.

The management server can store a record of applications installed on the user device. The record can be updated periodically or on demand. In one example, the management server requests an updated list of installed applications from the user device based on the application-discovery connector requesting such a list. The management server can provide a list of current applications to the application-discovery connector in one example. In another example, the management server can receive an identification of an application from the application-discovery connector and respond with confirmation that the application is either installed or not installed on the user device.

In examples where the user device is not enrolled with a management server, the application-discovery connector can contact a portal-application server (also referred to interchangeably as a "portal server"). The portal server can support a portal application that executes on the user device. The portal application can execute on the user device regardless of whether the device is enrolled at, and managed by, a management server. However, because the management server can have access to deeper information about an enrolled user device relative to the portal server, the management server can be queried at stage 130 for enrolled user devices and the portal application can be queried at stage 130 for non-enrolled user devices.

The portal server can support a portal application that executes on a user device and provides a graphical portal with various application icons displayed. The user can select an icon within the portal application to launch an application. If the application is a native application, selecting the icon can cause the application to be downloaded and installed on the user device. If the application is a web-based application, selecting the icon can launch the web-based application. The portal server can support the portal application by provisioning applications to the user device or routing requests to particular web-based applications. The portal server can also store an SSO token and provide it to an application launched through the portal application, eliminating the need to authenticate the user for each application available through the portal application.

The portal server can store a record of the applications provisioned to the user device through the portal application. In some examples, the portal server is not aware of the current installation status of an application—that is, the application may have been deleted by the user. But the portal server can at least determine whether a particular application has been requested and provisioned to the user device, and a date and time at which that event occurred. In that example, the application-discovery connector can query the portal server to request a history of application installation for a particular application and user device. The application-discovery connector can contact the portal server based on determining that the user device is not enrolled at the management server. This determination can be made by the application-discovery connector based on records accessible to the connector or by requesting a management status from the management server. The portal server can respond with information regarding whether the application has ever been installed on the user device, and if so, dates and times at which the application was last installed and executed.

At stage 140, if the application-discovery connector receives information from the management server or portal server that the application is not installed, the application-discovery connector can instruct the user device to prompt the user to install the application. The instruction can take the request of a card—that is, the application-discovery connector can generate and transmit a card to the user device. The card can include information sufficient for the user device to generate and display a graphical representation of the card. For example, it can include text for a title and a description of the application, a URL at which the application can be downloaded if the graphical element is selected, a template for the graphical element, and any supporting information necessary to display an actionable graphical prompt. If the application is already installed, the card can instead cause the user device to display a prompt to launch the application. In this way, a user can have a shortcut to download or open an application that relates to the content they are currently viewing on the user device.

Figure 2:
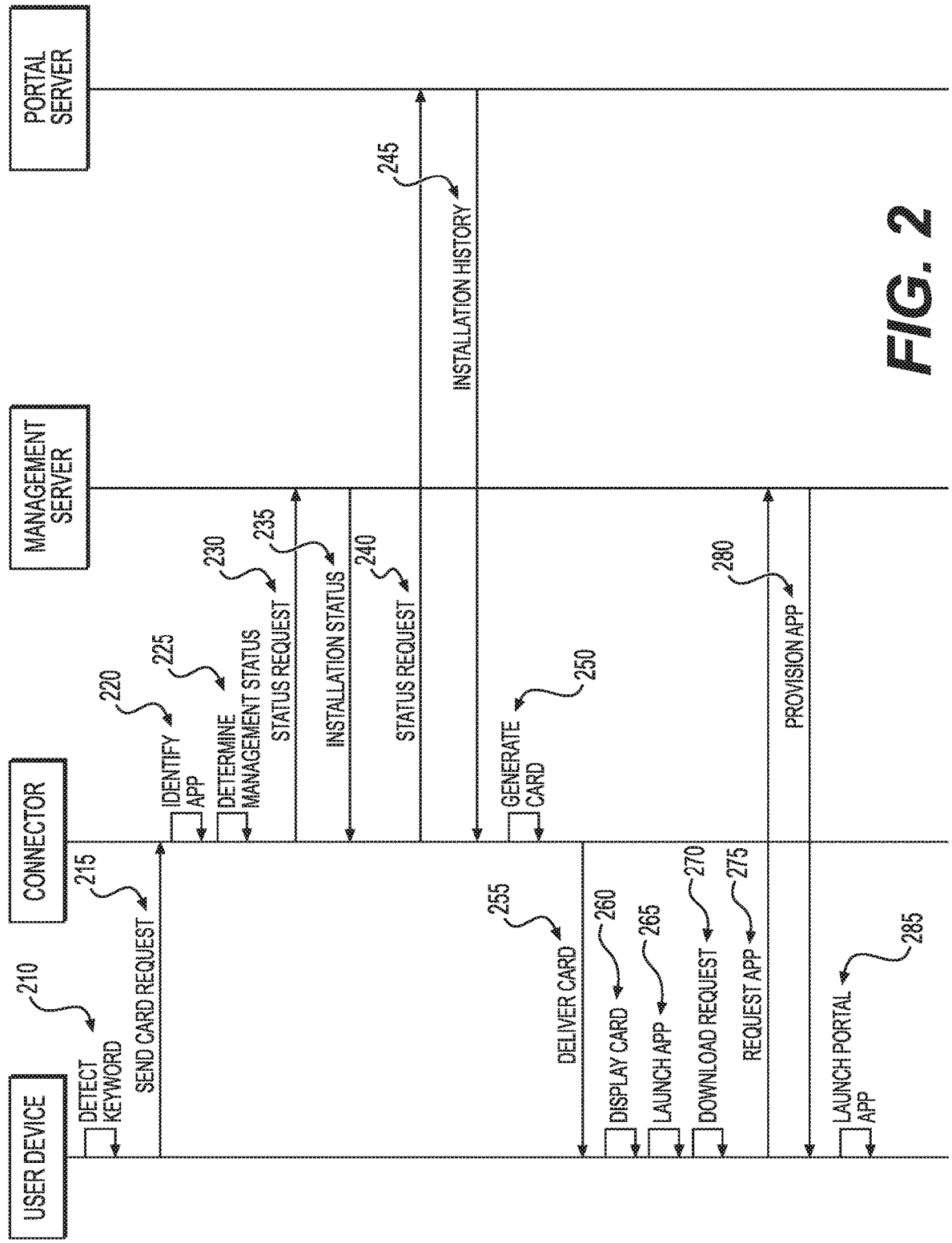
FIG. 2 is a sequence diagram of an example method for providing context-based application suggestions.

FIG. 2 provides an illustration of a sequence diagram for an example method of providing context-based application suggestions. At stage 210, a user device can detect a keyword. The detection process can be performed in any facet of the operating system executing on the user device, including within applications on the user device. In a common example, the detection process occurs with respect to an email being displayed by an email application executing on the user device. However, detection can occur within other applications, such as an application that provides access to a database where documents are stored and made available for retrieval. Alternatively, an agent running on the computing device can perform detection. The agent can be part of the operating system, part of the email application, or can operate as its own process. The detection can be performed by extracting text from a document or file that includes text, such as an email or a PDF document. In some examples, detection can be performed on an image file by performing character recognition to extract any text in the image file.

The extracted text can then be compared against a list of keywords and phrases stored at the user device. The list can be provided by the management server or portal server, for example. In some examples, a direct comparison is performed between the keywords and the words on the list. However, the comparison can also be performed as a "regular expressions" search and can incorporate machine learning techniques to correlate words and phrases to the keywords stored in the list. A machine-learning module can reside on the user device to perform this determination. In some examples, the machine-learning module is a piece of code that utilizes a machine-learning model trained remotely from the user device, such as at the management server. The machine-learning model can incorporate data from a large number of devices to produce more accurate search results and correlations between words and the listed keywords.

At stage 215, the user device can send a card request to the application-discovery connector. This stage can be performed in response to the user device detecting a keyword that corresponds to a previously identified keyword at stage 210. The card request can request a card from the application-discovery connector and can include various pieces of information necessary for the application-discovery connector to generate an appropriate card. For example, the card request can include an authorization token, such as an SSO token or a different token from an identity provider. The card request could also include a different form of authentication, such as a username and password or a certificate. The card request can include a device identification, such as a Device ID or UDID (unique device identification). The card request can also include an identification of the type of operating system present on the requesting user device, including in some examples a version or install date of the operating system. The card request can further include the keyword or keywords found in the relevant document, text, or display at the user device. In some examples, the card request can include an indication of whether the user device is enrolled at the management server.

At stage 220, the application-discovery connector can use the information in the card request to identify a relevant application. The application-discovery connector can utilize the operating-system identifier to narrow down the relevant applications to a particular operating system, such as iOS or ANDROID. To identify a particular application on the relevant platform, the application-discovery connector can compare the keywords provided in the card request to a list or table that provides keywords and one or more applications associated with each keyword.

In one example, a table provides a first column with keywords and a second column with corresponding applications. In an example row, the first column can include the keyword "NDA." The second column in the example row can include a corresponding "NDA App," which can be an NDA application developed in house that the user would otherwise be unaware of. In a second example row, the first column can include the keyword "non-disclosure agreement" while the second column includes the same corresponding "NDA App." In these examples, either of the keywords "NDA" or "non-disclosure agreement" would correspond to the NDA App.

The keywords in the table need not include full words. For example, a keyword can include wildcards or placeholders to broaden the applicability of the keyword. Rather than include separate rows for the keywords "expense," "expensing," and "expenses," for example, a single row could include the keyword "expens*," which would cover all three options. The keyword could also include a modifier, such as "expens*-expensive" to capture the variations of "expense" without capturing the word "expensive," which may not correspond to a relevant expense application.

At stage 225, the application-discovery connector can determine a management status of the user device. In some examples, the card request includes an indication of the management status of the user device. In other examples, the application-discovery connector has access to a database that stores updated information about the management status of a user device based on, for example, the device ID. In that scenario the application-discovery connector can use the device ID provided in the card request to look up the management status of the user device. In yet another example, the application-discovery connector can provide the device ID to the management server to request a management status. In some examples, the user device is either enrolled at or "managed" by the management server, or alternatively is not enrolled at the management server and is therefore "unmanaged." The application-discovery connector can proceed accordingly based on the determination at stage 225.

If the application-discovery connector determines that the user device is managed by the management server, then at stage 230 the application-discovery connector can request an application-installation status from the management server. The management server can store a record of applications currently installed on the user device. The record can be updated periodically or on demand. In one example, the management server requests an updated list of installed applications from the user device based on the application-discovery connector requesting such a list. Updating the list can ensure that an application that was previously installed on the user device but later uninstalled would be correctly reported as being uninstalled. The management server can provide a list of current applications to the application-discovery connector at stage 235. In another example, the management server can receive an identification of the application identified at stage 220 from the application-discovery connector and respond with confirmation that the application is either installed or not installed on the user device.

In examples where the user device is not enrolled with the management server, the application-discovery connector can request an application-installation status from the portal server at stage 240 in lieu of contacting the management server at stage 230. As explained with respect to FIG. 1, the portal server can support a portal application that executes on a user device and provides a graphical portal with various application icons displayed. The user can select an icon within the portal application to launch an application. If the application is a native application, selecting the icon can cause the application to be downloaded and installed on the user device. If the application is a web-based application, selecting the icon can launch the web-based application. The portal server can support the portal application by provisioning applications to the user device or routing requests to particular web-based applications. The portal server can also store an SSO token and provide it to an application launched through the portal application, eliminating the need to authenticate the user for each application available through the portal application.

The portal server can store a record of the applications provisioned to the user device through the portal application. In some examples, the portal server is not aware of the current installation status of an application—that is, the application may have been uninstalled by the user. But the portal application can at least determine whether a particular application has been requested and provisioned to the user device, and a date and time at which that event occurred. In that example, the application-discovery connector can query the portal server to request a history of application installation for a particular application and user device at stage 240. The application-discovery connector can contact the portal server at stage 240 based on determining that the user device is not enrolled at the management server. This determination can be made by the application-discovery connector based on records accessible to the connector or by requesting a management status from the management server. The portal server can respond at stage 245 with information regarding whether the application has ever been installed on the user device, and if so, dates and times at which the application was last installed and executed.

Although stages 220-245 describe the application-discovery connector first identifying an application before requesting an installation status for that particular application, the process can occur in the opposite order in some examples. For instance, the application-discovery connector can request a complete listing of installed applications from the management server or portal server at stage 230 or 240, respectively, and then identify the relevant application from the card request afterwards. The application-discovery connector can then compare the identified application to the already-received status reports.

Figure 3:
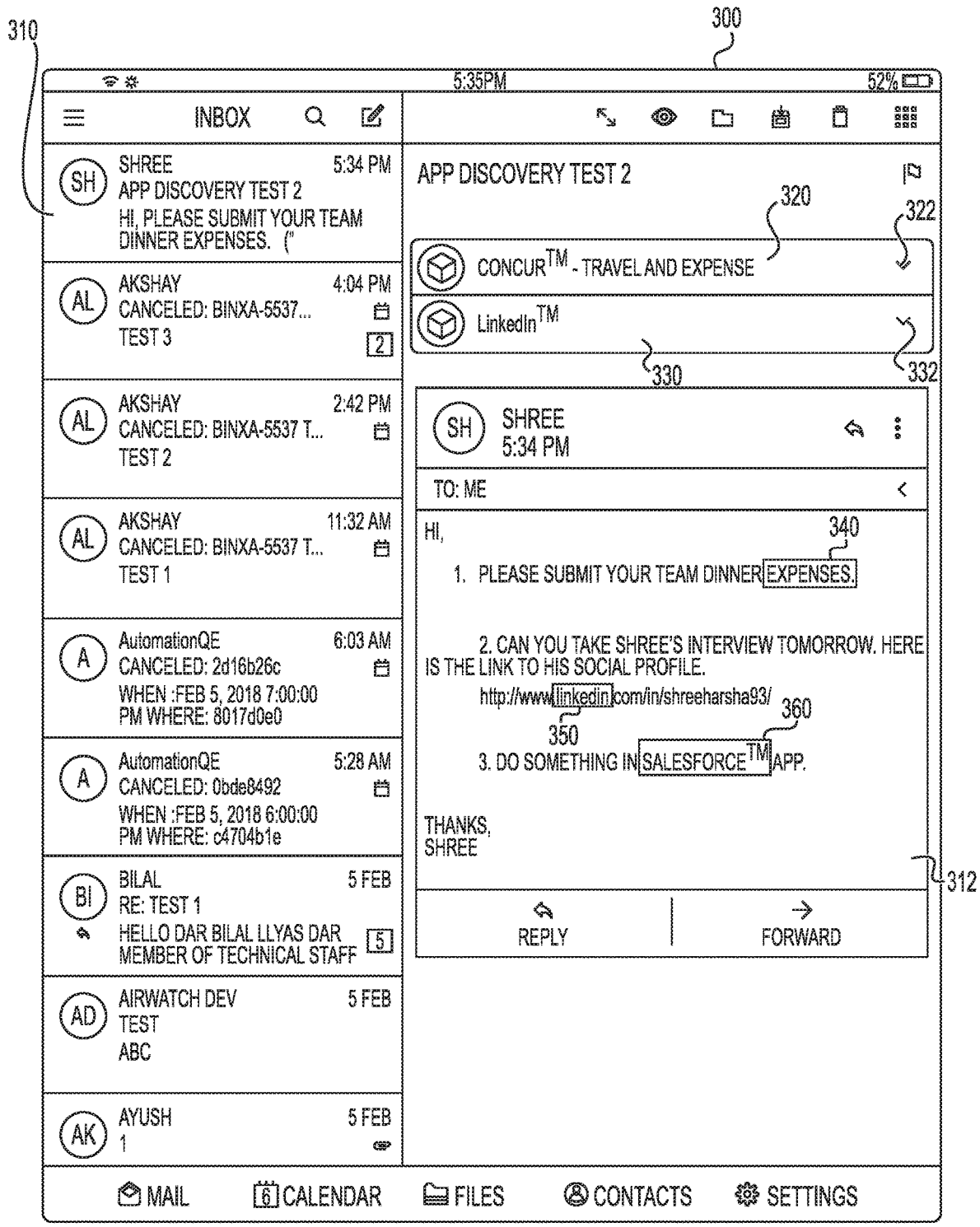
FIG. 3 is an example GUI of a user device displaying context-based application suggestions.
Figure 4:
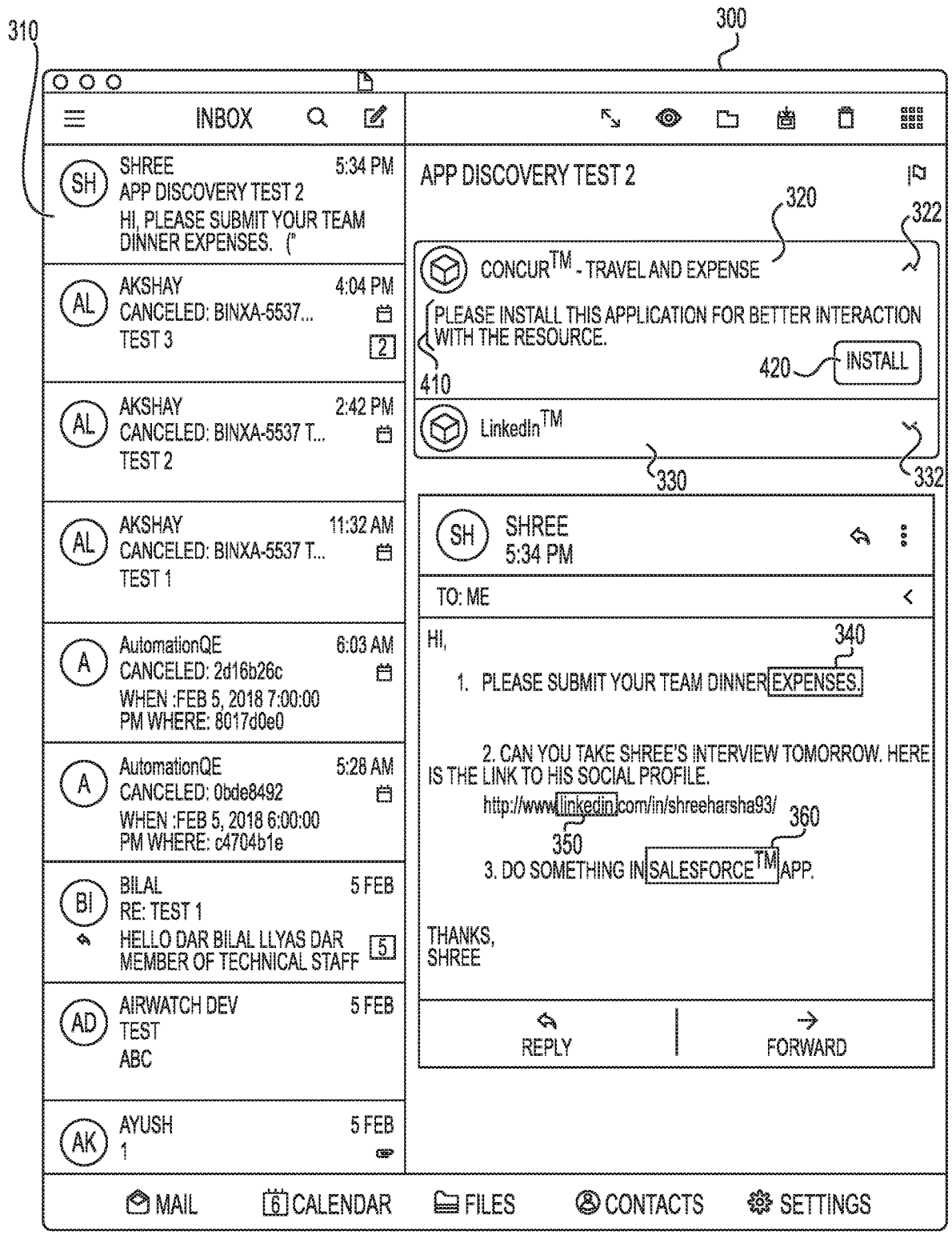
FIG. 4 is an example GUI of a user device displaying context-based application suggestions.

Regardless of the order of operations described above, in some examples the application-discovery connector can determine that the identified application is not currently present on the user device (if the device is managed) or, at least, that the application has not been installed on the user device in the past (if the device is unmanaged). In either case, the application-discovery connector can generate a card at stage 250. Generating a card at stage 250 can include generating instructions for the user device to display a graphical card. The card generated by the application-discovery connector can include information sufficient for the user device to generate and display a graphical representation of the card. For example, it can include text for a title and a description of the application, a URL at which the application can be downloaded if the graphical element is selected and the application is not yet installed, a hook or application programing interface ("API") link that causes the application to be launched if the graphical element is selected and the application is already installed, a template for the graphical element, and any supporting information necessary to display an actionable graphical prompt. The card can also include a device identifier, operating system identifier, and application name to allow the user device to confirm these details before proceeding. Examples of graphical cards are shown in FIGS. 3 and 4, for example.

The card can be delivered to the user device from the application-discovery connector at stage 255. This stage can include causing the card to be sent from the management server or portal server in some examples. In other examples, a separate server associated with the application-discovery connector can send the card to the user device.

At stage 260, the user device can display a graphical card corresponding to the card delivered at stage 255. The user device can generate the graphical card based on instructions in the card. For example, the user device can retrieve a template identified by the card and insert text into the template as specified by the card. The graphical card can include interactive graphical elements that a user can interact with. As shown in FIGS. 3 and 4, for example, the graphical card can be displayed in a condensed format with a graphical element allowing the user to expand the card to view more text and one or more actionable elements.

Based on the user's interaction with the graphical card, various stages can be performed next. In an example where the application-discovery connector determined that the user device already includes the application identified at stage 220, then the graphical card displayed at stage 260 can provide a graphical element causing the application to be launched on the user device. In this example, when that graphical element is selected, the relevant application is launched at stage 265.

In an example where the application-discovery connector determined that the user device does not include the application identified at stage 220, then the graphical card displayed at stage 260 can provide a graphical element corresponding to a request to download the application. In this example, selecting the graphical element can produce a download request at the user device at stage 270. In some examples, the download request at stage 270 includes a prompt at the user device, such as the one shown in FIG. 5, requesting confirmation that the agrees to have the management server install and manage the application.

If the user agrees at stage 270, or if stage 270 is processed automatically without requesting user confirmation, then at stage 275 the user device can request the application from the management server. The management server can provision the application at stage 280. Provisioning the application can include transmitting the application directly to the user device in some examples. In another example, provisioning the application at stage 280 includes identifying a storage location at which the user device can retrieve the application and instructing the user device to access that storage location and retrieve the application. For example, the application can be stored in a command queue that the user device can access to download content. In yet another example, provisioning the application at stage 280 includes instructing the user device to download the application from a public location, such as an application store. In this example the user device can set up the application to be managed by the management server.

Figure 6:
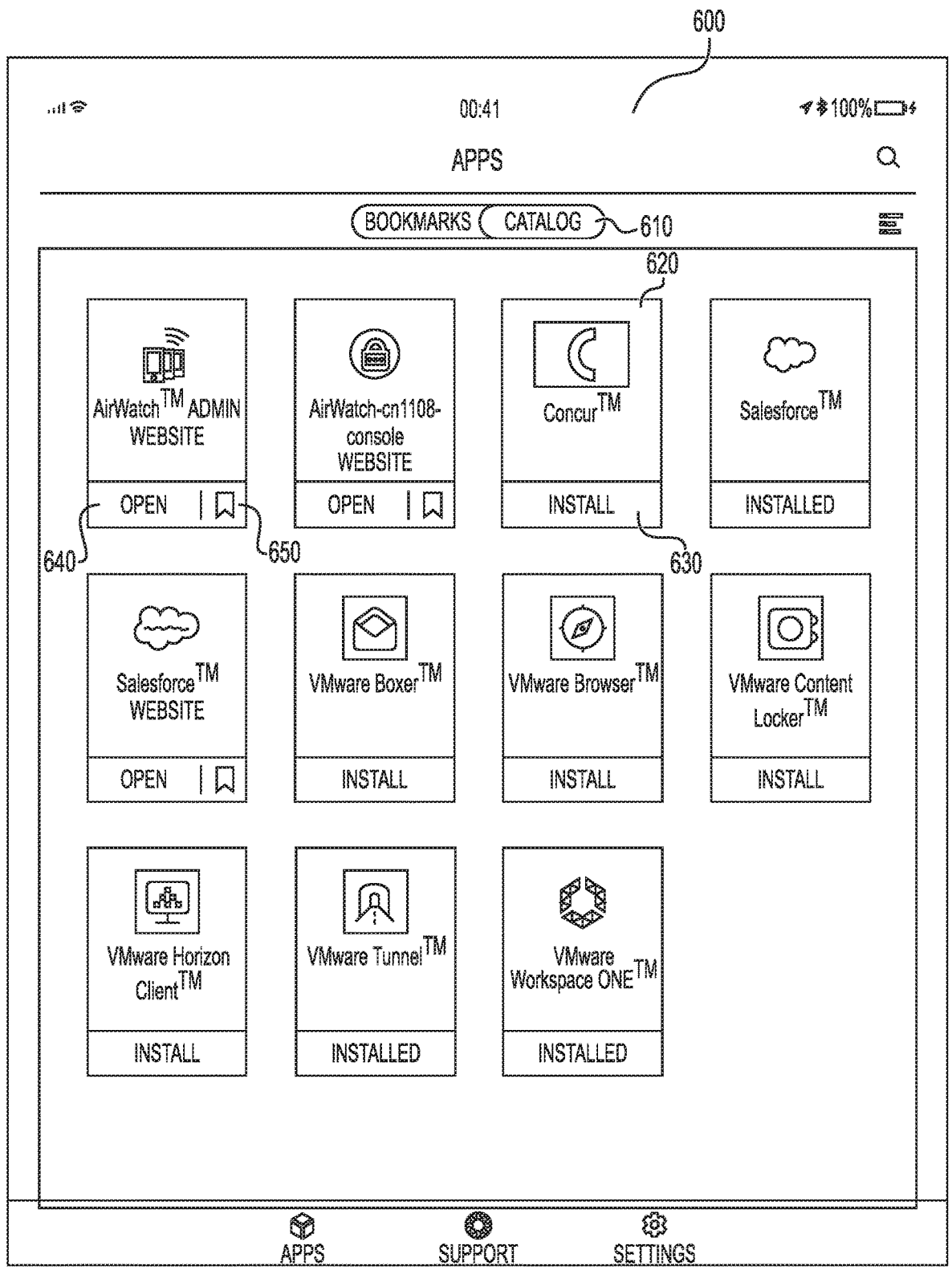
FIG. 6 is an example GUI of a user device displaying a portal application through which a user can install a suggested application.

Stages 265-280 can apply in examples where the user device is a managed device. In examples where the user device is not managed but the user attempts to access the application by interacting with the graphical card displayed at stage 260, the user device can proceed to stage 285. At stage 285 the portal application can be launched at the user device. As shown in FIG. 6, the portal application can include GUI with icons associated with various applications, including the application identified by the card displayed at stage 260. The user can interact with a graphical icon associated with the application, causing the portal application to either launch the application, download the application, or otherwise provide access to the application.

Turning to FIG. 3, an example GUI 300 is provided for displaying context-based application suggestions at a user device. The GUI 300 of FIG. 3 shows an example application executing on a user device. In this example, the application is an email client, such as VMWARE's BOXER application. The GUI 300 includes a column of emails along the left side of the GUI 300, including a selected email 310. The email entries in the column along the left side includes information such as a sender name, email subject, time of receipt, and a preview of the text within the body of the email. This particular GUI 300 is optimized for a user device with a relatively large display; for smaller user devices, the column of email entries can fill the GUI 300 until a particular email entry is selected, at which point an expanded view of the selected email can be shown. In the example of FIG. 3, an expanded view 312 of the selected email 310 is shown on the right-hand side of the GUI 300.

The expanded email 312 shows the full text of the email, including three keywords 340, 350, 360 that have been detected by the user device. The detection process can occur in the manner described with respect to stage 210 of FIG. 2, for example. In this example, the detected keywords 340, 350, 360 include graphical indications that those words have been detected as keywords 340, 350, and 360. While the GUI 300 can provide these graphical indications as shown, in some examples the graphical indications are not provided to the user.

Based on the detected keywords 340, 350, 360, two graphical cards 320, 330 have been displayed on the GUI 300. The graphical cards 320, 330 can be generated, delivered, and displayed as discussed in various stages of FIG. 2, such as stages 250, 255, and 260. In this example, a first graphical card 320 includes a title of an application (CONCUR) as well as an expandable graphical element 322 that, when selected by the user, expands the graphical card 322 as shown in FIG. 4. Similarly, a second graphical card 330 includes a title of another application (LINKEDIN) and an accompanying expandable graphical element 332.

The first and second graphical cards 320, 330 can correspond to the detected keywords 340, 350, 360 as described previously. In this example, the first graphical card 320 corresponds to the first detected keyword 340 and the second graphical card 330 corresponds to the second detected keyword 350, which resides within a URL. In this example, the third detected keyword 360 did not generate a graphical card. This can be because the user device already includes the application implicated by the third detected keyword 360 (SALESFORCE) or because the implicated application is not available to the user device.

FIG. 4 shows the same example GUI 300 as FIG. 3 after a user has selected the expandable graphical element 322 associated with the first graphical card 320. As shown, the expanded view of the first graphical card 320 can include details 410 that provide an explanation to the user regarding the first graphical card 320 and an action available to the user. In this example, the details 410 prompt the user to install the identified application for better interaction with the resource. This language can be determined by an administrator as desired. The expanded view of the first graphical card 320 also includes an actionable graphical element 420 that, when selected by the user of the user device, performs an action. In this example, the actionable graphical element 420 installs the application at the user device.

As mentioned above, the application relating to the third detected keyword 360 is not identified in a graphical card because, for example, the application might already be installed on the user device. In some examples, however, an installed application can still generate a graphical card. In those examples, an expanded view of that graphical card can prompt the user to launch the application and can include an actionable graphical element that, when selected by the user, causes that application to launch on the user device.

Figure 5:
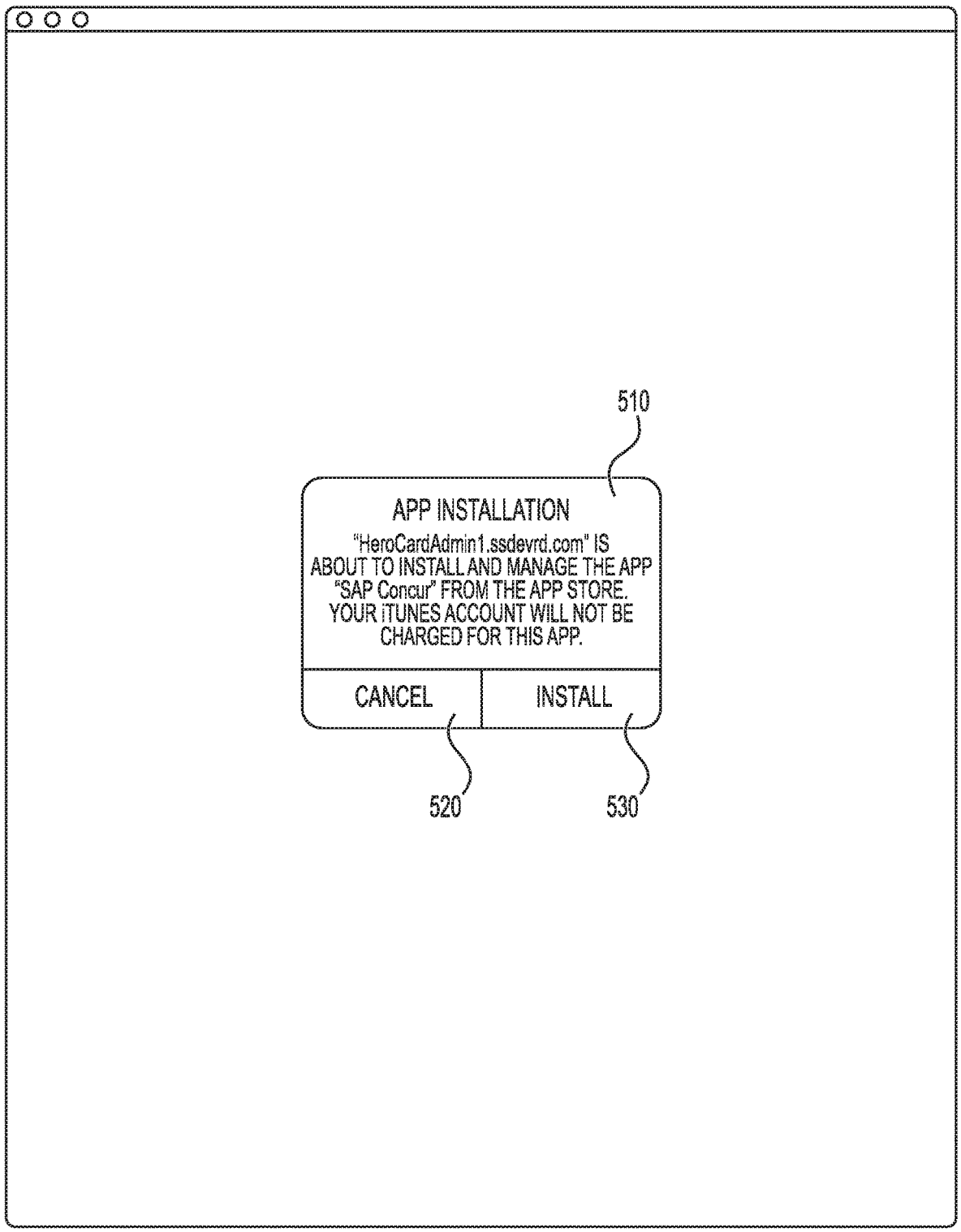
FIG. 5 is an example GUI of a user device prompting the user to install a suggested application.

FIG. 5 shows an installation prompt 510 that can be displayed on the user device in response to the user selecting to install an application, such as by selecting the actionable graphical element 420 of FIG. 4. The prompt 510 can be displayed on top of the GUI 300 of FIG. 3 or 4 or can be displayed on a different page, such as a blank page as shown in FIG. 5. The prompt 510 can explain that a server, such as a management server, will install and manage an application. It can include information such as where the application will be retrieved from, whether the application will generate a cost to the user, or any other relevant information. The prompt 510 can also include an install button 530 that the user can select to proceed with installation or a cancel button 520 that will cancel the installation process.

FIG. 6 shows a GUI 600 associated with a portal application executing on a user device. The portal application, as explained above, can provide a graphical portal with various application icons displayed. The user can select an icon within the portal application to launch or install an application, depending upon whether the application is already installed on the user device or whether it is a web-based application. The GUI 600 of the portal application can include a catalog, accessible through a selection element 610, that shows a listing of icons associated with various applications. In the example of FIG. 6, each icon associated with a web-based application includes the designation "WEBSITE" in the description of the icon. The web-based application icons also include a graphical element 640 for opening the web-based application, as well as graphical element 650 for bookmarking the website associated with that application.

The GUI 600 of the portal application also includes a selectable icon 620 associated with installable applications, such as the application identified in the first graphical card 320 discussed with respect to FIGS. 3 and 4. The user can select an install button 630 to install the relevant application through the portal application. In an example where the user device is unmanaged, the card delivered to the user device by the application-discovery connector can include instructions to launch the portal application in certain situations. For example, if the user selects the actionable graphical element 420 from FIG. 4 to install the application, the user device can launch the portal application rather than attempting to install the application using the management server. In some examples, if the application is already installed through the portal application, selecting the actionable graphical element 420 from FIG. 4 causes the portal application to install the application as if the user had just selected the icon 620 within the portal application.

In some examples, rather than showing the catalogue of the portal application as shown in FIG. 6, the portal application can be opened directed to a page corresponding to the desired application. Further, in some examples the portal application can automatically being downloading or launching the desired application rather than showing a catalogue that the user can select from.

FIG. 7 provides an illustration of an example system for performing the various methods described herein. The system can include a user device 710. The user device 710 can be any computing device, such as a smartphone, laptop, tablet, personal computer, or workstation. A user device 710 can include a non-transitory, computer-readable medium containing instructions that are executed by a hardware-based processor of the user device 710. Example non-transitory, computer-readable mediums include RAM and ROM, disks, and other memory and storage that is accessible by a USB port, a floppy drive, CD-ROM, or DVD-ROM drive, and a flash drive, among others.

The user device 710 can include an application 712 that displays content for the user. The application 712 can be an email application, a document-viewer application, a web-browser application or any other type of application the displays content that can include text. The user device 710 can also include a library 714 containing keywords to be used when detecting keywords in the content displayed by the application 712. As described with respect to stage 210 of FIG. 2, the user device 710 can extract or parse text to be searched for keywords. The keywords can be stored in the library 714 in the form of one or more lists or tables. In some examples, the library 714 at the user device 710 can include one or more lists or libraries from other sources, such as a management server 730 and portal server 740.

The user device 710 can also include a machine-learning module 716. When comparing extracted or parsed text from the application 712 to keywords listed in the library 714, the user device 710 can perform a direct comparison or can perform a "regular expressions" search. The search can incorporate machine-learning techniques to correlate words and phrases to the keywords stored in the library 712. In some examples, the machine-learning module 716 is a piece of code that utilizes a machine-learning model trained remotely from the user device 710, such as at the management server 730. The machine-learning model can incorporate data from a large number of user devices 710 to produce more accurate search results and correlations between words and the listed keywords.

The system can also include a management server 730. The management server 730 can include multiple servers, processors, and computing devices. In some examples, the management server 730 is a network of servers, some of which can be located remotely from one another. In another example, the management server 730 is a single server with multiple purposes. In yet another example, the management server 730 is a server (or group of servers) dedicated to the operations described herein. A system administrator can have privileges associated with managing, editing, revising, and otherwise administrating functions associated with the management server 730. The administrator can perform these functions through a console 734, for example.

The management server 730 can include a device services component 732. The device services component 732 can be a portion of the management server 730, such logic or a process running on the management server 730. In some examples, the device services component 732 is a separate server. The device services component 732 can store information regarding the status of the user device 710. For example, the user device 710 can include a management component that communicates with the device services component 732 and provides information. For example, the user device 710 can provide information regarding its management status, enrollment status, compliance status, geographic location, the applications installed on the device 710, usage statistics associated with the applications installed on the device 710, a battery level of the device 710, and any other information residing on the device 710. The device services component 732 can store this information and correlate it to a particular user device 710 and user. The device services component 732 can also request updates to that stored information, periodically or on demand, or both.

The management server 730 can also include a console 734 that is a part of, or communicatively coupled to, the management server 730. An administrator can utilize the console 734 to access and configure settings, policies, and rules stored and enforce by the management server 730. An administrator can access the console 734 by, for example, navigating to a web location using a web browser on a computing device. The console 734 can also be provided as a standalone application on a computing device. The administrator can use the console 734 to perform various management activities, such as enrolling a user device, creating user groups, pushing device updates, and creating profiles for users or user devices. Because the console 734 can be communicatively coupled to the management server 730, settings or instructions saved at the console 734 can also be saved at, or automatically transmitted to, the management server 730. An administrator can use the console 734 to configure keywords that correlate to specific applications. The administrator can also use the console 734 to enable an application-discovery connector 720 for specific user devices 710.

The management server 730 can also include one or more libraries 736. The libraries 736 stored on the management server 730 can include a library configured to be used on a specific user device 710. For example, the management server 730 can store a custom library 714 for different devices 710, based on information such as the device type, operating system type, the user, an organizational group of the user, a geographic location of the user, and any other relevant information relating to the user or user device 710 of interest. The management server 730 can provide one of the libraries 736 to the user device 710 for the purposes of performing various methods described herein. One or more applications or an agent on the user device can use the library to detect keywords.

The system of FIG. 7 can also include a portal server 740. The portal server 740 can support a portal application that executes on the user device 710, as described in previous examples. The portal application can execute on the user device 710 regardless of whether the device is enrolled at, and managed by, the management server 730. As explained previously, the portal application provides a graphical portal with various application icons displayed. The user can select an icon within the portal application to launch, open, or install an application. The portal server 740 can support the portal application by provisioning applications to the user device 710 or routing requests to particular web-based applications. The portal server 740 can also store an SSO token and provide it to an application launched through the portal application, eliminating the need to authenticate the user for each application available through the portal application.

The portal server 740 can include an install history 742 for a user device 710. The install history 742 can store a record of the applications provisioned to the user device 710 through the portal application. In some examples, the portal server 740 is not aware of the current installation status of an application on the user device 710—that is, the application may have been deleted by the user. But the portal server 740 can at least determine whether a particular application has been requested and provisioned to the user device 710, and a date and time at which that event occurred.

The portal server 740 can also include libraries 744 similar to the libraries 736 stored at the management server 730. The libraries 744 stored on the portal server 740 can include a library 714 configured to be used on a specific user device 710. For example, the portal server 740 can store a custom library for different devices 710, based on information such as the device type, operating system type, the user, an organizational group of the user, a geographic location of the user, and any other relevant information relating to the user or user device 710 of interest. The portal server 740 can provide one of the libraries 744 to the user device 710 for the purposes of performing various methods described herein.

The system of FIG. 7 can also include an application-discovery connector 720. The connector 720 can be one or more pieces of code that, when invoked, translates commands between a source and a destination. In some examples, the application-discovery connector 720 executes on the management server 730 at which the user device 710 is enrolled. In other examples, the application-discovery connector 720 executes on the portal server 740. In yet other examples, the application-discovery connector 720 executes on a separate server.

The application-discovery connector 720 can receive card requests from the user device 710 and provide cards back to the user device 710. To do so, the application-discovery connector 720 can request an application-installation status for the user device 710 from the device services component 732 of the management server 730. If the user device 710 is managed by the management server 730, the device services component 732 can retrieve a status of applications installed on the user device 710 and provide it to the application-discovery connector 720.

In some examples, the application-discovery connector 720 can query the portal server 740 to request an install history 742 for a particular application or for all applications provided to the user device 710 through the portal application. The application-discovery connector 730 can contact the portal server 740 based on determining that the user device 710 is not enrolled at the management server 730. This determination can be made by the application-discovery connector 720 based on records accessible to the connector 720 or by requesting a management status from the management server 730. The portal server 740 can respond with information regarding whether one or more specific applications have ever been installed on the user device 710, and if so, dates and times at which the application was last installed and executed.

Based on the information received from the management server 730 or portal server 740, the application-discovery connector 720 can generate a card and send it to the user device 710 as described with respect to stages 250 and 255 of FIG. 2, for example.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing context-based application suggestions, comprising:
   receiving at a server, from a user device, a card request that comprises a keyword extracted from an email displayed on a graphical user interface ("GUI") of an email application executing on the user device, the card request including a device ID;
   identifying an application based, at least in part, on the keyword;
   requesting, from a management server, an indication of whether the user device is managed by the management server, the management server being configured to:
      exercise management control over the user device by causing software to be installed on the user device that collects and provides information to the management sever; and
      use the device ID to determine a management status;
   receiving an indication from the management server that the user device is managed by the management server;
   requesting, from the management server, an application-installation status indicating a record of applications installed on the user device;
   determining whether the application is installed on the user device by comparing the identified application to the record of applications installed on the user device; and
   if the application is not installed on the user device:
      generating a card instruction configured to cause the user device to display a card on the GUI of the email application; and
      sending the card instruction to the user device,
      wherein the card displayed on the GUI prompts the user to install the application.

2. The method of claim 1, further comprising if the application is installed on the user device, instructing the user device to prompt the user to launch the application.

3. The method of claim 1, wherein determining whether the application is installed on the user device comprises querying a portal application server to determine if the application has previously been installed on the user device.

4. The method of claim 1, wherein the keyword is selected by the user device using a machine-learning model that associates the keyword with the application.

5. A non-transitory, computer-readable medium containing instructions executed by a hardware-based processor to perform stages for providing context-based application suggestions, the stages comprising:
   receiving at a server, from a user device, a card request that comprises a keyword extracted from an email displayed on a graphical user interface ("GUI") of an email application executing on the user device, the card request including a device ID;
   identifying an application based, at least in part, on the keyword;
   requesting, from a management server, an indication of whether the user device is managed by the management server, the management server being configured to:
      exercise management control over the user device by causing software to be installed on the user device that collects and provides information to the management sever; and
      use the device ID to determine a management status;
   receiving an indication from the management server that the user device is managed by the management server;
   requesting, from the management server, an application-installation status indicating a record of applications installed on the user device;
   determining whether the application is installed on the user device by comparing the identified application to the record of applications installed on the user device; and
   if the application is not installed on the user device:
      generating a card instruction configured to cause the user device to display a card on the GUI of the email application; and
      sending the card instruction to the user device,
      wherein the card displayed on the GUI prompts the user to install the application.

6. The non-transitory, computer-readable medium of claim 5, the stages further comprising if the application is installed on the user device, instructing the user device to prompt the user to launch the application.

7. The non-transitory, computer-readable medium of claim 5, wherein determining whether the application is installed on the user device comprises querying a portal application server to determine if the application has previously been installed on the user device.

8. The non-transitory, computer-readable medium of claim 5, wherein the keyword is selected by the user device using a machine-learning model that associates the keyword with the application.

9. A system for providing context-based application suggestions the system comprising:
   a non-transitory, computer-readable medium that contains instructions;
   a hardware-based processor that executes the instructions to perform stages including:
      receiving at a server, from a user device, a card request that comprises a keyword extracted from an email displayed on a graphical user interface ("GUI") of an email application executing on the user device, the card request including a device ID;
      identifying an application based, at least in part, on the keyword;
      requesting, from a management server, an indication of whether the user device is managed by the management server, the management server being configured to:
         exercise management control over the user device by causing software to be installed on the user device that collects and provides information to the management sever; and
         use the device ID to determine a management status;
      receiving an indication from the management server that the user device is managed by the management server;
      requesting, from the management server, an application-installation status indicating a record of applications installed on the user device;
      determining whether the application is installed on the user device by comparing the identified application to the record of applications installed on the user device; and
      if the application is not installed on the user device:
         generating a card instruction configured to cause the user device to display a card on the GUI of the email application; and
         sending the card instruction to the user device,
         wherein the card displayed on the GUI prompts the user to install the application.

10. The system of claim 9, the stages further comprising if the application is installed on the user device, instructing the user device to prompt the user to launch the application.

11. The system of claim 9, wherein determining whether the application is installed on the user device comprises querying a portal application server to determine if the application has previously been installed on the user device.

* * * * *